(12) United States Patent
Mavroudis et al.

(10) Patent No.: US 10,188,132 B2
(45) Date of Patent: Jan. 29, 2019

(54) REFINED PLANT ISOLATES AND PROCESS FOR THE MANUFACTURE OF A FUNCTIONAL FOOD INGREDIENT FROM SUCH PLANT ISOLATE

(71) Applicant: Conopco Inc., Englewood Cliffs, NJ (US)

(72) Inventors: Nikolaos Mavroudis, Newcastle-upon-Tyne (GB); Marco Giuseppe Mazzotti, Zurich (CH)

(73) Assignee: Conopco Inc., Englewood Cliffs, NJ (US)

( * ) Notice: Subject to any disclaimer, the term of this patent is extended or adjusted under 35 U.S.C. 154(b) by 0 days.

(21) Appl. No.: 15/363,534

(22) Filed: Nov. 29, 2016

(65) Prior Publication Data

US 2017/0071244 A1    Mar. 16, 2017

Related U.S. Application Data

(62) Division of application No. 13/989,459, filed as application No. PCT/EP2011/069836 on Nov. 10, 2011, now abandoned.

(30) Foreign Application Priority Data

Nov. 30, 2010 (EP) .................................... 10193129

(51) Int. Cl.

| | |
|---|---|
| *A23L 33/105* | (2016.01) |
| *A23L 27/22* | (2016.01) |
| *A23L 33/18* | (2016.01) |
| *A23L 19/00* | (2016.01) |
| *A23L 33/175* | (2016.01) |
| *A23L 33/16* | (2016.01) |
| *A23L 5/20* | (2016.01) |
| *A23L 27/10* | (2016.01) |
| *A23L 27/12* | (2016.01) |
| *A23L 33/185* | (2016.01) |
| *A23L 2/08* | (2006.01) |

(52) U.S. Cl.

CPC ............ *A23L 33/105* (2016.08); *A23L 2/082* (2013.01); *A23L 5/27* (2016.08); *A23L 5/273* (2016.08); *A23L 19/09* (2016.08); *A23L 27/10* (2016.08); *A23L 27/12* (2016.08); *A23L 27/22* (2016.08); *A23L 33/16* (2016.08); *A23L 33/175* (2016.08); *A23L 33/18* (2016.08); *A23L 33/185* (2016.08); *A23V 2002/00* (2013.01); *A23V 2200/00* (2013.01)

(58) Field of Classification Search
None
See application file for complete search history.

(56) References Cited

U.S. PATENT DOCUMENTS

| | | | |
|---|---|---|---|
| 3,165,415 A | 1/1965 | Kilburn et al. | |
| 5,436,002 A * | 7/1995 | Payne ................... | A01N 63/00 424/93.2 |
| 5,436,022 A * | 7/1995 | Chiang .................. | A23L 19/09 426/330.5 |
| 5,871,574 A * | 2/1999 | Kawaragi .............. | C09B 61/00 106/406 |
| 5,879,733 A | 3/1999 | Ekanayake | |
| 7,122,217 B1 * | 10/2006 | McPeek ................. | A23L 23/00 426/589 |
| 7,476,399 B2 * | 1/2009 | Tachdjian ............. | C07C 233/65 424/400 |

(Continued)

FOREIGN PATENT DOCUMENTS

| | | |
|---|---|---|
| CN | 101522050 | 2/2009 |
| CN | 101902926 | 1/2010 |

(Continued)

OTHER PUBLICATIONS

Amore Tomato Paste: published online at least by Feb. 27, 2006 as verified by the comment by Eva Camposon, on Feb. 27, 2006, at: https://www.amazon.com/Amore-Tomato-Paste-DoubleConcentrated/dp/B0005XN9HI/ref=cm_cr_arp_d_product_top?ie=UTF88ah=1 (Year: 2006).*
Cambeen: WO2010069743 A1; published Jun. 24, 2010. (Year: 2010) (Year: 2010) (Year: 2010).*
Luh: Flame Photometric Determination of Calcium, Magnesium, and Potassium in Canned Tomatoes; Food Science, vol. 24, Issue 3, May 1959, pp. 305-309. (Year: 1995) (Year: 1995) (Year: 1995).*
Williams: Some Carbohydrate Components of Tomato; Agricultural and Food Chemistry; vol. 2, No. 9, Apr. 28, 1954. (Year: 1954).*
US: United States: Division of the Federal Register; The Code of Federal regulations of the United States of America: having general applicability and legal effect in force Jun. 1, 1938, vols. 18-30; Division of the Federal Register, the National Archives, 1947 (Year: 1947).*

(Continued)

*Primary Examiner* — Patricia A George

(74) *Attorney, Agent, or Firm* — N.V. Nederlandsch Octrooibureau; Catherine A. Shultz; Tamara C. Stegmann

(57) ABSTRACT

The present invention is concerned with providing refined plant isolates that can be used as starting materials for the production of functional food ingredients, such as taste enhancers, through an isolation process that employs ion exclusion chromatography. More particularly, the present invention provides a refined plant isolate comprising at least 30% by weight of dry matter of water soluble plant components selected from fructose, glucose, proteinaceous matter of plant origin, acids and potassium, said isolate further being characterized in that at a concentration of 40° Brix the isolate: •contains at least 0.3 wt % of glutamate; •contains at least 500 ppm of $K^+$; •contains less than 300 ppm of $Ca^{2+}$; •contains less than 700 ppm of $Mg^{2+}$; •contains less than 1 wt. % of components capable of passing an ultra filtration membrane having a molecular weight cut off of 250 kDa;

(Continued)

wherein the concentration ratio $([Ca^{2+}]+[Mg^{2+}])/[K^+]$ does not exceed 5:100, each of said cation concentrations being expressed in ppm.

11 Claims, No Drawings

(56) References Cited

U.S. PATENT DOCUMENTS

| 8,420,151 B2* | 4/2013 | Ley | A23L 27/45 |
| | | | 426/648 |
| 2009/0004343 A1* | 1/2009 | Xiong | A23L 2/39 |
| | | | 426/115 |

FOREIGN PATENT DOCUMENTS

| GB | 1411455 | 10/1975 |
| WO | WO2004041003 A1 | 5/2004 |
| WO | WO2007071727 A2 | 6/2007 |
| WO | WO2008040611 | 4/2008 |
| WO | WO2009080768 | 2/2009 |
| WO | WO2009080763 | 7/2009 |
| WO | WO2010069743 | 6/2010 |
| WO | WO2010079013 | 7/2010 |

OTHER PUBLICATIONS

Young: Accumulation of the Components of Total Solids in Ripening Fruits of Tomato; J. Amer. Soc. Hort. Sci. 118(2):286-292. 1993. (Year: 1993).*

Wang: Effect of processing condition on the physicochemical and sensory characteristics of Stanley plum paste; Journal of Food Processing and Preservation 19(1):65-81, Jan. 1995. (Year: 1995).*

Wikipedia: Brix, published online at least by Nov. 28, 2007 at: http://web.archive.org/web/20071128104306/http://en.wikipedia.org/wiki/Brix (Year: 2007).*

Tomato Paste: tomato, paste, vegetables, Calorie Count, Mar. 11, 2009, pp. 1-2; http://web.archive.org/web/20090311134250/http://caloriecount.about.com/calories-hunts-tomato-paste-i97138, ., US.

Tomato products, canned, paste, without salt added, Self Nutrition Data, 2012, pp. 1-3http://web.archive.org/web/20100717055220/http://nutritiondata.self.com/facts/vegetables-and-vegetable-products/2689/2#.

Amazon, 32 Ounce, Heinz Ketchup, Oct. 13, 2006, pp. 1-11, US.

Amazon, Organic Ketchup 24-Ounce, Annie's Naturals, Jun. 12, 2008, pp. 1-7, US.

B.S. Luh et al., Flame photometric determination of calcium, magnesium, and potassium in canned tomatoes, Food Science, 1958, pp. 305-309, vol. 24, issue 3.

Boggio et al., Changes in amino acid composition and nitrogen metabolizing enzymes in ripening fruits of Lycopersicon esculentum Mill, Plant Science, 2000, pp. 125-133, vol. 159, Elsevier.

Donald B. Bradley, The Separation of Organic and Inorganic Acid Anions in Filtered Tomato Puree by Partition Chromatography, Agricultural and Food Chemistry, 1960, pp. 1-3, 8 No. 3, ., ., US.

G. Pratta et al., Glutamine and glutamate levels and related metabolozing enzymes in tomato fruits with different shelf-life, Scientia Horticulturae, Jan. 1, 2004, pp. 341-347, vol. 100, AR.

Heuvelink, Dry Matter Partitioning in Tomato: Validation of a Dynamic Simulation Model, Annals of Botany, 1996, pp. 71-80, vol. 77, NL.

Nutrition Facts and Analysis for catsup (Ketchup), SND 2 Self Nutrition Data, Jul. 11, 2010, pp. 1-2, US.

Palmer, How to Brew, How to Brew, Feb. 23, 2001, pp. 1-5, Chapter 15, Section 3, US.

Tomato Products, Canned, Paste, without Salt Added, SND Self Nutrition Data 100 Gram Serving, Jul. 17, 2010, pp. 1-4, US.

Wang, Effect of processing condition on the physicochemical & sensory characterisated of Stanley plum paste, Journal of Food Processing and Preservation, Jan. 1, 1995, pp. 65-81, 19(1), US.

Williams et al., Some Carbohydrate Components of Tomato, Agricultural and Food Chemistry, Apr. 28, 1954, pp. 472-474, vol. 2, No. 9, US.

Young et al., Accumulation of the Components of Total Solids in Ripening Fruits of Tomato, J Amer Soc Hort Sci, 1993, pp. 286-292, vol. 118 No. 2, US.

* cited by examiner

REFINED PLANT ISOLATES AND PROCESS FOR THE MANUFACTURE OF A FUNCTIONAL FOOD INGREDIENT FROM SUCH PLANT ISOLATE

CROSS REFERENCE TO RELATED APPLICATIONS

This application is a Divisional Application of U.S. patent application Ser. No. 13/989,459, filed on Jun. 24, 2013, which is a National Phase entry of International Patent Application Serial No. PCT/EP11/69836, filed on Nov. 10, 2011, claiming priority to European Application Serial No. 10193126, filed on Nov. 30, 2010, the entire contents of which are hereby incorporated by reference in their entirety.

TECHNICAL FIELD OF THE INVENTION

The present invention relates to the isolation of functional food ingredients from plant materials that are rich in glutamate and potassium, such as tomatoes, potatoes, peas, corn, beets, carrots, onions, spinach, green peppers etc. More particularly, the present invention is concerned with providing refined plant isolates that can advantageously be used as starting materials for the production of functional food ingredients, such as taste enhancers, through an isolation process that employs ion exclusion chromatography. The invention further provides a process for the manufacture of functional food ingredients from the aforementioned refined plant isolates.

BACKGROUND OF THE INVENTION

Plant materials are an economic source of a number widely utilized functional food ingredients, notably biopolymers. Thus, it is well-known in the art to isolate functional food ingredients such as starch, inulin, pectin and proteins, from plant materials.

In addition, there is an increasing interest for plant-derived functional food ingredients that can be used as natural or 'friendly label' alternatives for existing ingredients that consumers perceive as less desirable. These functional ingredients include plant-derived flavour components, taste enhancers, salt replacers, anti-oxidants, emulsifiers and colourings.

WO 2004/041003 discloses an edible flavor improver comprising an essentially non-volatile mixture containing non-sucrose components of sugar beet extract, said mixture being effective in enhancing the organoleptic characteristic(s) of ingestible products and being obtainable by fractionation of said sugar beet extract. Example 3 describes a fraction that is obtained from beet molasse. The main cations of the sample were Na and K (about 100 g/kg of liquid of each). The sample contained about 5.5% rafinose, about 1.7% sucrose, and less than 0.1% of each of glucose, fructose, inositol and betaine. The sample contained 12.3% lactic acid, 6.1% L-2-pyrrolidone-5-carboxylic acid (PCA), 2.8% acetic acid, 1.9% formic acid and 1.0% citric acid, 0.23 aspartic acid, 0.2% glutamic acid and minor amounts of neutral amino acids. These percentages are calculated on the total dry substance in the fraction.

In order to produce plant-derived functional food ingredients in high yield and/or high purity, it is often necessary to make use of sophisticated separation techniques, such as chromatographic techniques.

WO 2009/080763, for instance, describes a method for preparing an umami active fraction from concentrated tomato serum (12.5° Brix) comprising the following steps:
subjecting the concentrated tomato serum to ultrafiltration to yield a permeate that is substantially free from lycopene;
concentrating the permeate to 40° Brix strength;
fractionating the concentrated permeate using ion exclusion chromatography;
collecting a fraction of the eluate (0.43-0.66 bed volume) that is enriched in glutamic acid;
concentrating the eluate fraction to 20° Brix;
fractionating concentrated eluate fraction using ion exclusion chromatography and using the same conditions as in the first fractionation step.
collecting a fraction of the eluate (0.43-0.66 bed volume) that is further enriched in glutamic acid.

WO 2010/069743 describes a similar method for preparing an umami enhancing composition from concentrated tomato serum. WO 2009/080768 describes a similar method for preparing a natural sweetening agent from concentrated tomato serum, also using ion exclusion chromatography.

A drawback of the use of ion exclusion chromatography in the aforementioned methods resides in the fact that the separation efficiency of the ion exclusion resins was found to decline rather rapidly over time, making it necessary to regenerate the column material after short intervals.

SUMMARY OF THE INVENTION

The inventors have unexpectedly discovered that the separation efficiency of the ion exclusion materials used in the aforementioned methods can be maintained for a much longer period of time if prior to subjecting a plant derived material to ion exclusion chromatography, the multivalent metal cation content of said material is reduced substantially. Although the inventors do not wish to be bound by theory, it is believed that the divalent cations $Ca^{2+}$ and $Mg^{2+}$ can reduce the number of available charges of the ion exclusion resin by forming stable bridges between adjacent negatively charged resin groups, thereby impairing the ion exclusion ability of the resin bed. As the adsorption of these divalent cations by the resin progresses, chromatographic resolution of charged and neutral compounds will increasingly deteriorate. Also the separation of charged compounds may be adversely affected by the adsorption of $Ca^{2+}$ and $Mg^{2+}$ onto ion exclusion resin.

It is known in the art from GB 1 411 455 that alkaline earth ions contained in refiner's syrup adversely effect the extraction of sugar from molasses by an ion exclusion method, and further that this adverse effect can be minimized by removing these disturbing alkaline earth ions by precipitation with suitable salts or by base exchange on a cation exchange resin. Molasses contain unusually high concentration of $Ca^{2+}$ and $Mg^{2+}$. The examples of GB 1 411 455 show that the cation exchange resin used in the ion exchange step can suitably be regenerated using a waste water fraction generated by the ion exclusion step that contained K and Na as well as appreciable levels of Ca and Mg.

Although a person skilled in the art may recognize that the presence of appreciable levels of alkaline earth metals in a feed may adversely effect the separation efficiency of ion exclusion chromatography, it is surprising that alkaline earth metals can negatively affect the separation efficiency of ion exclusions chromatography if these alkaline earth metals are present in low concentrations and if the feed contains high levels of $K^+$.

Thus, one aspect of the present invention relates to a refined plant isolate that contains appreciable levels of glutamate and potassium and that can suitably be used as a starting material for an isolation process that employs ion exclusion chromatography, said isolate being characterized in that the amount of $Ca^{2+}$ and $Mg^{2+}$ contained therein has been reduced substantially. More particularly, this aspect of the invention concerns a refined plant isolate comprising at least 30% by weight of dry matter of water soluble plant components, said isolate further being characterized in that at a concentration of 40° Brix the isolate:
- contains at least 0.3 wt % of glutamate;
- contains at least 500 ppm of $K^+$;
- contains less than 300 ppm of $Ca^{2+}$;
- contains less than 700 ppm of $Mg^{2+}$;
- contains less than 1 wt. % of components capable of passing an ultra filtration membrane having a molecular weight cut off of 250 kDa;

wherein the concentration ratio $([Ca^{2+}]+[Mg^{2+}])/[K^+]$ does not exceed 5:100, each of said cation concentrations being expressed in ppm.

Another aspect of the present invention relates to a process of preparing a functional food ingredient, said process comprising:
- providing a refined plant isolate as defined above;
- subjecting the refined plant isolate, optionally after concentrating or diluting said refined plant isolate, to ion exclusion chromatography; and
- collecting at least a part of the eluate of said ion exclusion chromatography as the functional food ingredient or an intermediate for the production of a functional food ingredient.

DETAILED DESCRIPTION OF THE INVENTION

One aspect of the present invention relates to refined plant isolate comprising at least 30% by weight of dry matter, preferably at least 50% by weight of dry matter, and most preferably at least 60% by weight of dry matter of water soluble plant components selected from fructose, glucose, proteinaceous matter of plant origin, acids and potassium, said isolate further being characterized in that at a concentration of 40° Brix the isolate:
- contains at least 0.3 wt % of glutamate;
- contains at least 500 ppm of $K^+$;
- contains less than 300 ppm of $Ca^{2+}$; preferably less than 100 of $Ca^{2+}$;
- contains less than 700 ppm of $Mg^{2+}$; preferably less than 300 ppm of $Mg^{2+}$;
- contains less than 1 wt. % of components capable of passing an ultra filtration membrane having a molecular weight cut off of 250 kDa;

wherein the concentration ratio $([Ca^{2+}]+[Mg^{2+}])/[K^+]$ does not exceed 5:100, each of said cation concentrations being expressed in ppm.

The terms "comprising" and "containing" whenever used in this document are intended to indicate the presence of stated features, integers, steps, components, but not to preclude the presence or addition of one or more other features, integers, steps, components or groups thereof.

The term "ion exclusion chromatography" as used herein refers to a form of ion exchange chromatography in which the mobile ions in the resin-gel phase electrically neutralize the immobilized charged functional groups attached to the resin, thus preventing penetration of solvent electrolyte into the resin-gel phase.

The term "proteinaceous matter" as used herein encompasses proteins, oligopeptides, free amino acids and combinations thereof.

The term "glutamate" as used herein encompasses glutamic acid, salts of glutamic acid and combinations thereof.

The term "citrate" as used herein encompasses citric acid, salts of citric acid and combinations thereof.

The concentrations of components comprised in the present refined plant isolate are sometimes defined "at a concentration of 40° Brix", meaning that said concentrations are defined in relation to a refined plant isolate of 40° Brix. Thus, if a refined plant isolate of 10° Brix contains 1.0 wt. % of glutamate this equates to a concentration of 4.0 wt. % of glutamate at 40° Brix.

The benefits of the present invention are particularly pronounced in case the $Ca^{2+}$ and $Mg^{2+}$ concentrations in the refined plant isolate are reduced to very low levels. Advantageously, at a concentration of 40° Brix, the refined isolate contains less than 300 ppm of $Ca^{2+}$, more preferably less than 200 ppm of $Ca^{2+}$, more preferably less than 50 ppm of $Ca^{2+}$ and most preferably less than 20 ppm of $Ca^{2+}$. Likewise, at a concentration of 40° Brix, the refined isolate preferably contains less than 700 ppm of $Mg^{2+}$, more preferably less than 300 ppm of $Mg^{2+}$, more preferably less than 100 ppm of $Mg^{2+}$ and most preferably less than 40 ppm of $Mg^{2+}$.

In accordance with a particularly advantageous embodiment of the present invention the refined plant isolate contains a significant amount of potassium ion. Accordingly, at a concentration of 40° Brix the isolate preferably contains at least 800 ppm of $K^+$ more preferably at least 1200 ppm of $K^+$, even more preferably at least 2000 ppm of $K^+$ and most preferably at least 5000 ppm of $K^+$.

Since potassium ions do not adversely affect the separation efficiency of the ion exclusion resins and since potassium is a valuable micronutrient, it is preferred to minimize the concentration of multivalent cations in the refined plant isolate whilst at the same time maximizing the amount of potassium ions contained therein. Thus, in accordance with a particularly preferred embodiment of the invention, the concentration ratio $([Ca^{2+}]+[Mg^{2+}])/[K^+]$ in the refined plant isolate does not exceed 3:100, each of said cation concentrations being expressed in ppm (mg/kg). More preferably the latter ratio does not exceed 2:100, even more preferably it does not exceed 1:100 and most preferably it does not exceed 0.3:100.

The refined plants isolates according to the present invention advantageously contain a substantial amount of sugars, notably glucose and fructose. Typically, at a concentration of 40° Brix the isolate contains:
- 0.1-30 wt. %, more preferably most preferably 5-15 wt. % of fructose; and/or
- 0.1-30 wt. %, more preferably, most preferably 5-15 wt. % of glucose.

Most preferably, both fructose and glucose are contained in the refined plant isolate in the aforementioned concentrations.

At a concentration of 40° Brix the present isolate typically contains 0.1-30 wt. %, more preferably 0.5-20 wt. %, most preferably 2-10 wt. % of proteinaceous matter of plant origin.

A particularly advantageous embodiment of the present invention relates to a refined plant isolate containing substantial levels of glutamate. Preferably, at a concentration of 40° Brix, the isolate contains at least 0.2 wt. %, more preferably at least 0.5 wt. % and most preferably at least 1 wt. % of glutamate. Typically, the glutamate concentration of the refined isolate does not exceed 30 wt. %, especially not 20 wt. %, more particularly it does not exceed 10 wt. %.

Citrate is another component that can be contained in the refined plant isolate in appreciable levels. Typically, at a concentration of 40° Brix, the isolate contains at least 0.001 wt. %, more preferably at least 0.01 wt. % and most preferably at least 0.1 wt. % of citrate. The citrate content of the isolate usually does not exceed 20 wt. %, especially not 10 wt. %.

Together, glutamate, citrate, glucose and fructose advantageously represent at least 1%, more preferably at least 10% and most preferably at least 20% by weight of the dry matter contained in the refined plant isolate. Typically, the latter components together represent not more than 97% by weight of the dry matter contained in the isolate.

The refined plant isolate of the present invention advantageously contains glutamate and citrate in a weight ratio (glutamate:citrate) that is within the range of 1:50 to 10,000:1. More preferably, the latter ratio lies within the range of 1:20 to 1,000:1, most preferably within the range of 1:10 to 500:1

The weight ratio glutamate:glucose of the present isolate preferably exceeds 1:100. More preferably said ratio exceeds 1:50. Most preferably the glutamate:glucose weight ratio exceeds 1:25 Typically, the weight ratio glutamate:glucose is not more than 100:1, especially not more than 10:1.

The refined plant isolates of the present invention can take the form of e.g. liquids, pastes or powders. Preferably, the isolate has a Brix strength of 2°-80°. More preferably, the isolate has a Brix strength of 5°-70°, most preferably of 10°-60°.

The refined plant isolate according to the present invention can suitably be produced from a variety of plant materials including, for instance, tomatoes, potatoes, peas, corn, beets, carrots, onions, spinach, green peppers and combinations thereof. Advantageously, the present isolate is produced from plant materials that are rich in glutamate. Examples of glutamate-rich plants that can be used as source materials for the present isolate include tomato, peas, corn, beets, carrots, onions, potato, spinach and green peppers. Preferably, the refined plant isolate is derived from a plant material selected from tomatoes, peas, corn, potato and combinations thereof. Most preferably, the refined plant isolate is a refined tomato isolate.

Another aspect of the present invention relates to a process of preparing a refined plant isolate as described herein before, said process comprising:
  providing an aqueous plant extract containing particles of plant material;
  removing from said plant extract more than 50 vol. % of the particles having a particle size of at least 2 μm to produce a crude serum wherein not more than 40 vol. % of the particles has a diameter larger than 2 μm;
  concentrating, if necessary, said crude serum to at least 2° Brix, preferably at least 10° Brix;
  removing $Ca^{2+}$ and $Mg^{2+}$ from the optionally concentrated serum to produce a refined plant isolate.

Here the terminology "if necessary" is used to indicate that the crude serum is to be concentrated if it is below the indicated Brix concentration (2° Brix or 10° Brix).

The concentration ratio $([Ca^{2+}]+[Mg^{2+}])/[K^+]$ in the refined plant isolate obtained in the aforementioned process preferably is at least 2 times, more preferably at least 3 times lower than the same concentration ratio in the optionally concentrated plant extract, each of these cation concentrations being expressed in ppm.

The aqueous plant extract that is used as starting material in the present process can suitably be obtained from plant materials by a variety of different techniques that may include, for instance, pressing, grinding, sieving and combinations of these processing techniques.

The plant extract that is employed in the present process preferably is an aqueous plant extract having a dry matter content of 0.01-80 wt. %, more preferably of 1-70 wt. % and most preferably of 2-60 wt. %.

The aqueous plant extract typically contains, by weight of dry matter, at least 30%, more preferably at least 50% and most preferably 80% of water soluble plant components selected from fructose, glucose, proteinaceous matter of plant origin, acids and potassium.

The aqueous plant extract that is employed in the present process can be obtained from a variety of plant materials, such as vegetables, fruit, herbs and spices. Preferably, the aqueous plant extract is obtained from vegetables and/or fruit. Examples of vegetables and fruit that can suitably be used as a source of the plant extract include tomato, potato, pea, corn, beet, carrot, onion, spinach, green pepper and combinations thereof. Preferably, the plant material that is used as a source of the plant extract is selected from tomato, pea, corn, potato and combinations thereof. Most preferably, said plant material comprises tomato.

According to a particularly preferred embodiment, the aqueous plant extract employed in the present process is a tomato juice, especially a tomato juice that is obtained by a process comprising:
  crushing tomatoes; and
  separating peel and seeds from the crushed tomatoes.

Here the term "tomato juice" also encompasses tomato juice serum that is obtained as the supernatant if tomato juice that is obtained after removal of peel and seeds is centrifuged.

In the present process, the particles may suitably be removed from the aqueous plant extract by means of solid-liquid separation techniques known in the art. Examples of suitable separation techniques include filtration and centrifugation; filtration being preferred.

Examples of filtration techniques that can be used to remove particles from the aqueous plant extract include crude filtration, microfiltration, ultrafiltration, nanofiltration and combinations thereof.

According to a particularly preferred embodiment, particles are removed from the aqueous plant extract by using a filtration membrane with a molecular weight cut-off (MWCO) of 25-500 kDa. Even more preferably, the membrane has a MWCO of 50-400 kDa, most preferably of 100-250 kDa.

The crude serum that is obtained after the particle removal, typically contains less than 30 vol. %, more preferably less than 20 vol. % of particles having a diameter in excess of 2 μm. Even more preferably, the crude serum contains less than 15 vol. %, more preferably less than 10 vol. % of particles having a diameter in excess of 2 μm.

The crude serum that is obtained after the particle removal typically has a Brix strength of 0.1-30°, more preferably of 1-200 and most preferably of 2-15°.

In the present process the crude serum and/or the refined plant isolate may suitably be concentrated before being subjected to the next processing step. Here, "concentrating" refers to the selective removal of water. Examples of concentrating techniques that can suitably be used include evaporation, reverse osmosis and combinations thereof.

The crude serum is advantageously concentrated to a Brix strength of 1-80°, more preferably to 5-40°, prior to the removal of $Ca^{2+}$ and $Mg^{2+}$.

Examples of techniques that may suitably be used to selectively remove $Ca^{2+}$ and $Mg^{2+}$ from the crude serum include electrodialysis, nanofitration, ion exchange chromatography or a combination of thereof. Preferably, these divalent cations are removed from the crude serum by means of ion exchange chromatography.

The $Ca^{2+}$ and $Mg^{2+}$ concentrations in the refined plant isolate are substantially reduced in comparison to the levels of these ions in the crude serum. Typically, calculated on dry matter, the combined concentration of $Ca^{2+}$ and $Mg^{2+}$ in the refined plant isolate is at least 4 times, more preferably at least 7 times, and most preferably at least 10 times lower than in the optionally concentrated crude serum.

The removal of $Ca^{2+}$ and $Mg^{2+}$ from the optionally concentrated serum advantageously is preferably carried out in such a way that the composition of the bulk remains largely unaffected. Thus, in a preferred embodiment, the composition of the dry matter contained in the optionally concentrated crude serum and the composition of the dry matter contained in the refined plant isolate are at least 75%, more preferably at least 80%, even more preferably at least 90% and most preferably at least 97% identical. The following table illustrates how the latter percentages are calculated.

|  | Composition A | Composition B | Common |
| --- | --- | --- | --- |
| Component 1 | 60 wt. % | 50 wt. % | 50 wt. % |
| Component 2 | 25 wt. % | 10 wt. % | 10 wt. % |
| Component 3 | 15 wt. % | 40 wt. % | 15 wt. % |
| Percentage identical = | | | 75 wt. % |

The refined plant isolate that is obtained after the removal of $Ca^{2+}$ and $Mg^{2+}$ typically has a Brix strength of 0.1-40°. More preferably, the refined plant isolate obtained after the removal of the latter cations has a Brix strength of 1-30°, most preferably of 2-20°.

Yet another aspect of the invention relates to a process of preparing a functional food ingredient, said process comprising:
  providing a refined plant isolate as defined herein before;
  subjecting the refined plant isolate, optionally after concentrating or diluting said refined plant isolate to ion exclusion chromatography; and
  collecting at least a part of the eluate of said ion exclusion chromatography as the functional food ingredient or an intermediate for the production of a functional food ingredient.

In the present process the ion exclusion chromatography is advantageously performed on a refined plant isolate that has been concentrated to 10-80° Brix, more preferably to 15-70° Brix and most preferably to 30-60 Brix.

The optionally concentrated refined plant isolate that is subjected to ion exclusion chromatography preferably contains appreciable amounts of glutamate and $K^+$. According to a particularly preferred embodiment, the $K^+$ concentration of the optionally concentrated refined plant isolate lies within the range of 5-200,000 ppm, more preferably in the range of 500-150,000 ppm and most preferably of 1000-100,000 ppm.

The glutamate concentration of the optionally refined plant isolate typically lies within the range of 0.1-75 wt. %. Even more preferably, the glutamate concentration of the plant isolate lies within the range of 0.5-65 wt. %, most preferably of 1-55 wt. %.

In the present process ion exclusion chromatography is advantageously used to fractionate the refined plant isolate into two or more fraction. Preferably, several of these fractions are further processed to yield different functional food ingredients.

The adsorbent material that is employed in the ion exclusion chromatography is preferably saturated with cationic ions, most preferably with $K^+$ ions.

The present process can suitably be used in the production of a variety of functional food ingredients, such as taste enhancers, salt replacers, sweeteners, acidulants, flavour ingredients. Thus, in accordance with a particularly preferred embodiment, the eluate collected in the present process is a functional food ingredient or an intermediate for the production of a functional food ingredient, said functional food ingredient being selected from taste enhancers, salt replacers, sweeteners, acidulants, flavour ingredients. Even more preferably, the functional ingredient is selected from taste enhancers, salt replacers and acidulants.

Advantageously, in the present process the ion exclusion chromatography yields a functional food ingredient that is enriched in glutamate, citrate or monosaccharide. Most preferably, the process yields a functional food ingredient that is enriched in glutamate. Here "enriched" means that the concentration of a component in the collected eluate is at least twice as high as in the refined plant isolate that is subjected to ion exclusion chromatography, both concentrations being calculated by weight of dry matter.

According to a particularly preferred embodiment, the weight ratio glutamate:citrate in the collected eluate is at least 5 times, more preferably at least 10 times and most preferably at least 2. times higher than the same ratio in the refined plant isolate that is subjected to ion exclusion chromatography.

In another preferred embodiment, the weight ratio glutamate:glucose in the collected eluate is at least 10 times, more preferably at least 20 times and most preferably at least 40 times higher than the same ratio in the refined plant isolate.

In accordance with a further embodiment, the collected eluate contains at least 2%, more preferably at least 4% and most preferably at least 6% of potassium by weight of dry matter.

The invention is further illustrated by means of the following non-limiting examples.

EXAMPLES

Comparative Example

Production of Concentrated Tomato Serum

Tomatoes were washed and pressed through square holes resulting in an aqueous liquid comprising soluble tomato solids and pulp. Sieves were used to remove seeds and skin and further separation was achieved using a Westfalia CA-365-010 decanter at a revolution speed of 4000 rpm.

The tomato serum was concentrated to 12.5 degrees Brix strength using a Mitchell pilot plant tray dryer with a dry bulb temperature of 65 degrees C. Next, the concentrated tomato serum was subjected to ultra filtration. The separation was carried out by ultra filtering the tomato serum through an Alfa-Laval polysulphone membrane with 100 kDa molecular weight cut-off (GR40PP). The ultra filtration was performed in the plate and frame module of an M20 Alfa-Laval filtration rig at 50 degrees Celsius with a trans-membrane pressure of 2-3 bars and a recirculation flow rate of 12 L/min for the retentate stream. The permeate was substantially free from lycopene.

The permeate obtained after the ultra filtration step was further concentrated by means of the same Mitchell tray dryer with a dry bulb temperature 65 degrees C. until reaching 40 degrees Brix strength.

Ion Exclusion Chromatography

Next, the concentrated permeate was used as a feed in ion exclusion chromatography by passing the feed over a XK 2.6/100 GE healthcare column. The ion exclusion resin used was DIAION™ UBK530 in its K+ form. The length of the resin bed was 95 cm and the diameter was 26 mm. The temperature of the column was kept at 65 degrees C. using a thermostat. The injection of feed and execution of the chromatography setup was achieved using an AKTA explorer 100 system from GE healthcare.

A 5% Bed Volume (BV) of feed was injected followed by 2BV of elution, using a mixture of demineralised water and tomato feed as the eluent. This procedure was carried out 60 times. The strength of the eluent was 0.6 Brix. The eluent cross flow velocity was set to 0.95 cm/min.

The first 0.3BV of each eluate was discarded and the remaining eluate was collected as samples at different BV intervals. Samples were subjected to compositional analysis.

Glucose, was determined by HPLC, using Aminex™ HPX-87H column, 300×7.8 mm and 5 mM sulphuric acid, pH=2 as eluent, flow rate 0.6 ml/min, at 65° C. Detection was carried out using UV (220 nm) and refractive index detector. This method may slightly overestimate the amount of glucose as the trace amount of sucrose in the tomato fraction is inverted to glucose and fructose. For the present purpose this was ignored and the values of glucose have not been corrected. The glutamic acid was determined by AccQTag™ HPLC method of Waters Cooperation USA.

Ca and Mg were measured using emission spectroscopy. The samples were extracted in diluted hydrochloric acid and the solution so obtained was sprayed into the inductively coupled plasma of a plasma emission spectrometer (ICP), after which the emission was measured at 317.933 nm (Ca) and at 285.213 nm (Mg). Both calcium and magnesium content was determined by comparison with blank and standard solutions of these elements in diluted hydrochloric acid (direct method of determination)

The potassium content of the samples was determined by extracting the samples with an aqueous hydrochloric acid solution. The extract was diluted in a flow injection system (FIAS) with a releasing agent of Sr in water and sprayed into the air-acetylene flame of an atomic absorption spectrometer (FAAS), after which the potassium was measured at 766.5 nm. The element content is determined by comparison with aqueous standard solutions of potassium.

The Ca, Mg and K concentrations of the concentrated (40 Brix) permeate are shown in Table 1.

Table 2 shows the retention times of glutamate and glucose after 20, 40 and 60 injections. Clearly, the separation of glutamate and glucose deteriorates dramatically with the number of injections.

TABLE 1

| Mineral | Concentration ppm (wet basis) |
|---|---|
| Ca | 337 |
| Mg | 724 |
| K | 25,000 |

TABLE 2

| Injection number | Glutamate retention in Bed Volume [BV] | Glucose retention in Bed Volume [BV] |
|---|---|---|
| 14 | 0.58 | 0.63 |
| 20 | 0.58 | 0.60 |
| 40 | 0.55 | 0.58 |
| 60 | 0.51 | 0.50 |

Example 1

A concentrated permeate (40 Brix) was prepared in the same way as described in the Comparative Example. The concentrated permeate was contacted with ion exchange resin to remove Ca and Mg prior to being used as a feed for ion exclusion chromatography.

Production of Refined Tomato Isolate

The ion exchange, IEX, step was performed in a stirred vessel configuration. The concentrated permeate was mixed in a vessel with the ion-exchanger (Lewatit™ 2568 resin) with the help of a top agitator. 1.5 Liter of resin was added in a vessel and preconditioned with a number of washing steps for removing all other minerals and bringing the resin in the K form. First the resin was acid washed by addition of 3 Liters of 10% w/w HCL that remained in contact under vigorous stirring for 1 hr. The acid was removed by washing steps with demineralised water until the conductivity of the decanted effluents was lower than 20 microS/cm. An alkaline washing step of the resin took place by addition of 3 Liters of 10% w/w KOH that remained in contact with the resin under vigorous stirring for 1 hr. The alkali was removed by washing steps with dematerialized water until the conductivity of the decanted effluents was lower than 20 microS/cm.

Following the end of conditioning the 1.5 liter resin was mixed with 6 liters of the concentrated permeate (40 Brix) and the mixture was vigorously stirred for 2 hr. At the end, the tomato liquids were decanted from the resin, collected and subjected to 2 more treatments with the ion exchange resin using the same procedure. The partially diluted tomato liquids were concentrated back to 40 Brix prior to each ion exchange step using a Mitchell pilot plant tray dryer with a dry bulb temperature of 65 degrees C.

Production of Functional Food Ingredient

The concentrated permeate with reduced Ca and Mg content was subjected to ion exclusion chromatography using the procedure described in the Comparative Example.

The Ca, Mg and K concentrations of the 40 Brix concentrated permeate after ion exchange treatment are shown in Table 3 below.

Table 4 shows the retention times of glutamate and glucose after 20, 41 and 62 injections. Clearly, separation of glutamate and glucose deteriorates at a much slower rate than in the Comparative Example.

TABLE 3

| Mineral | Concentration ppm (wet basis) |
|---|---|
| Ca | 51 |
| Mg | 180 |
| K | Appr. 30,000 |

TABLE 4

| Ion Exclusion injection number | Glutamate retention in Bed Volume [BV] | Glucose retention in Bed Volume [BV] |
|---|---|---|
| 20 | 0.44 | 0.56 |
| 41 | 0.40 | 0.57 |
| 62 | 0.40 | 0.58 |

Example 2

A concentrated permeate (40 Brix) was prepared in the same way as described in the Comparative Example. The concentrated permeate was subjected to ion exchange chromatography to remove Ca and Mg prior to being used as a feed for ion exclusion chromatography.

Production of Refined Tomato Isolate

Ion exchange chromatography was performed on a 4 column pilot scale ion exchanger apparatus manufactured by UNIPEKTIN™ Engineering AG, Eschenz, Switzerland. The bed volume of each column was 75 liters with an inner diameter of 20 cm. A 2×2 column configuration was used. The feed followed by the demi water eluent were pumped by the main pump and were divided into 2 streams. Each stream passed via 2 columns connected in series and was then collected at the exit of the ion exchange unit. The flow was adjusted by means of magnetic inductive flow meters.

Lewatit™ 2568 resin was mixed with water and packed in the columns. Next, a number of washing steps were used to bring the resin in the K form. First 2 bed volumes (BV) of demineralised water at a speed of 4BV/hr were passed over the packed resin. Then 2BV of 0.5% w/w $H_2SO_4$ at a speed of 2BV/hr, followed by 2BV of 16% w/w $H_2SO_4$ at a speed of 2BV/hr. the acid was removed by 2BV of demineralised water pumped at a flow rate of 4BV/hr. The conductivity of the effluents dropped bellow 100 µS/cm. Then 3BV 10% w/w KOH was pumped over the resin at a flow rate of 2BV/hr. The alkali was totally removed by pumping 16Bv of demineralised water at a flow rate of 8BV/hr. At the end of this step the conductivity of the effluents was measured and was bellow 60 µS/cm.

Subsequently, 73 liters of the 40 Brix concentrated permeate were injected followed by 280 liters of demineralised water at a flow rate of 280 liters/hr. All liquids where collected and were subjected to an evaporation step to yield a concentrate of 40 degrees Brix. The evaporation step was performed with a Centritherm™ Model CT-1B, Flavourtech Europe Ltd, Reading, UK. The evaporation step was taking place at 50° C. at an evaporation rate of ca 30 liters/hr.

The Ca, Mg and K concentrations of the concentrated permeate (40 Brix) before and after ion exchange (IEX) chromatography is shown in Table 5.

TABLE 5

| Mineral | Before IEX Concentration ppm (wet basis) | After IEX Concentration ppm (wet basis) |
|---|---|---|
| Ca | 342 | 12 |
| Mg | 781 | 35 |
| K | 25,000 | Not determined |

Production of Functional Food Ingredient

The concentrated permeate with reduced Ca and Mg content was used as a feed in ion exclusion chromatography by passing the feed over a 2 cm inner diameter stainless steel column by Knauer GmbH. The ion exclusion resin used was the DIAION™ UBK530 in its $K^+$ form. Three columns of 2 cm ID×25 cm length (Knauer GmbH) were combined providing a 75 cm total length of resin bed. The temperature of the column was kept at 65 degrees C. using a Knauer GmbH thermostated oven. The injection of feed and execution of the chromatography setup was achieved using 2 S-1000 Knauer pumps each with 10 mL/min pump heads (Knauer GmbH). One pump was used for the feed and one for the eluent pumping. Refractive index was traced using a Knauer S-2400 RI detector. A 5% Bed Volume (BV) of feed was injected followed by 1.5BV of elution, where demineralised water was used as the eluent. The eluent cross flow velocity was set to 0.95 cm/min.

The first 0.2BV of each injection was discarded and the remaining elution of the chromatography was collected as samples at different BV intervals.

Table 6 shows the retention times of glutamate and glucose after 42 and 65 injections. This data shows that resolution of glutamate and glucose is substantially better than the comparative examples and example 1. In addition resolution has hardly worsened after as many as 65 injections.

TABLE 6

| Ion Exclusion injection number | Glutamate retention in Bed Volume [BV] | Glucose retention in Bed Volume [BV] |
|---|---|---|
| 20 | Not determined | Not determined |
| 42 | 0.39 | 0.58 |
| 65 | 0.39 | 0.58 |

The invention claimed is:

1. A process of preparing a functional food ingredient, said process comprising:
 a) providing an aqueous plant extract containing particles of plant material;
 removing from the aqueous plant extract more than 50 vol. % of particles comprising a size of at least 2 µm to produce a crude serum having at least 2° Brix, wherein not more than 40 vol. % of the particles in the crude serum have a diameter larger than 2 µm;
 removing Ca2+ and Mg2+ from the crude serum to produce the refined plant isolate, wherein a reduction of Ca2+ and Mg2+ in the refined plant isolate reduces a need to regenerate columns used in ion exclusion chromatography of step b)
 wherein the refined plant isolate comprises:
 a concentration of 40° Brix;
 at least 0.2 wt % of glutamate;
 at least 500 ppm of $K^+$;
 less than 300 ppm of $Ca^{2+}$;
 less than 700 ppm of $Mg^{2+}$;

less than 1 wt. % of components incapable of passing an ultra-filtration membrane having a molecular weight cut off of 250 kDa;

a concentration ratio ($[Ca^{2+}]+[Mg^{2+}]$)/$[K^+]$ that does not exceed 5:100, wherein the $[Ca^{2+}]$, $[Mg^{2+}]$ and $[K^+]$ are expressed in ppm;

wherein the concentration ratio ($[Ca^{2+}]+[Mg^{2+}]$)/$[K^+]$ of the refined plant isolate is at least 2 times lower than a concentration ratio ($[Ca^{2+}]+[Mg^{2+}]$)/$[K^+]$ expressed in ppm of the aqueous plant extract;

b) subjecting the refined plant isolate to ion exclusion chromatography by using columns; and c) collecting at least a part of an eluate of the ion exclusion chromatography as the functional food ingredient or an intermediate for the process of preparing the functional food ingredient; wherein the functional food ingredient or the intermediate comprises:

at least 30% by weight of dry matter of water soluble plant components selected from fructose, glucose, proteinaceous matter of plant origin, acids and potassium;

a weight ratio glutamate:citrate of at least 5 times higher than in the refined plant isolate;

and/or a weight ratio glutamate:glucose of at least 10 times higher than in the refined plant isolate.

2. The process according to claim 1, wherein the particles are removed from the aqueous plant extract by a method selected from the group consisting of filtration and centrifugation.

3. The process according to claim 2, wherein the particles are removed by filtration employing a membrane with a molecular weight cut-off of 25-500 kDa.

4. The process according to claim 1, wherein $Ca^{2+}$ and $Mg^{2+}$ are removed from the crude serum by a method selected from the group consisting of electrodialysis, nanofitration, ion exchange chromatography, and combinations thereof.

5. The process according to claim 1, wherein, calculated on dry matter, the combined concentration of $Ca^{2+}$ and $Mg^{2+}$ in the refined plant isolate is at least 4 times lower than in the crude serum.

6. The process according to claim 1, wherein the refined plant isolate contains less than 100 ppm of $Ca^{2+}$.

7. The process according to claim 1, wherein the crude serum is concentrated to at least 10° Brix.

8. The process according to claim 1, wherein the concentration ratio ($[Ca^{2+}]+[Mg^{2+}]$)/$[K^+]$ in the refined plant isolate is at least 3 times lower than the ratio in the aqueous plant extract.

9. The process according to claim 5, wherein the combined concentration of $Ca^{2+}$ and $Mg^{2+}$ in the refined plant isolate is at least 7 times lower than in the crude serum.

10. The process according to claim 1, wherein the refined plant isolate is concentrated or diluted prior to step b).

11. The process according to claim 1, wherein the crude serum is concentrated.

* * * * *